(12) United States Patent
Yim et al.

(10) Patent No.: US 10,235,578 B2
(45) Date of Patent: Mar. 19, 2019

(54) MOBILE TERMINAL AND CONTROL METHOD THEREFOR

(71) Applicant: LG ELECTRONICS INC., Seoul (KR)

(72) Inventors: Soyeon Yim, Seoul (KR); Shinhui Ahn, Seoul (KR); Youjin Jeon, Seoul (KR); Soomin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 15/508,073

(22) PCT Filed: Mar. 12, 2015

(86) PCT No.: PCT/KR2015/002402
§ 371 (c)(1),
(2) Date: Mar. 1, 2017

(87) PCT Pub. No.: WO2016/035955
PCT Pub. Date: Mar. 10, 2016

(65) Prior Publication Data
US 2017/0286783 A1  Oct. 5, 2017

(30) Foreign Application Priority Data

Sep. 1, 2014 (KR) ........................ 10-2014-0115603

(51) Int. Cl.
*G06K 9/00* (2006.01)
*H04B 7/00* (2006.01)
(Continued)

(52) U.S. Cl.
CPC .......... *G06K 9/00805* (2013.01); *G01B 11/00* (2013.01); *G01B 11/026* (2013.01); *G06F 1/1613* (2013.01); *G06F 3/017* (2013.01); *G06F 3/14* (2013.01); *G06F 3/147* (2013.01); *G06K 9/00664* (2013.01); *G06K 9/00671* (2013.01); *G06K 9/22* (2013.01); *G06T 7/74* (2017.01); *G09G 5/14* (2013.01); *H04M 1/72569* (2013.01)

(58) Field of Classification Search
USPC ........ 382/100, 103–104, 106–107, 155, 162, 382/168, 173, 181, 199, 209, 219, 220, 382/224, 232, 254, 274, 276, 286–291, 382/312; 353/85; 455/41.2, 566; 702/167
See application file for complete search history.

(56) References Cited

U.S. PATENT DOCUMENTS

2004/0096083 A1* 5/2004 Matsunaga ................ B25J 5/00
                                                                        382/104
2011/0304833 A1* 12/2011 Osaka ..................... G03B 21/00
                                                                        353/85
(Continued)

FOREIGN PATENT DOCUMENTS

JP   2006174288   6/2006
JP   2010009607   1/2010
(Continued)

OTHER PUBLICATIONS

PCT International Application No. PCT/KR2015/002402, International Search Report dated Jun. 30, 2015, 4 pages.

*Primary Examiner* — Seyed H Azarian
(74) *Attorney, Agent, or Firm* — Lee, Hong, Degerman, Kang & Waimey

(57) ABSTRACT

The present invention relates to a mobile terminal for detecting an obstacle in the front, comprising: a display unit; a laser sensor for detecting an obstacle located on a moving route by irradiating a laser beam; and a control unit for controlling so as to activate the laser sensor when a predetermined event is detected, measure the distance to an obstacle detected through the activated laser sensor, and display obstacle notification information on the display unit when the measured distance is within a threshold distance.

18 Claims, 17 Drawing Sheets

(51) Int. Cl.
  *G03B 21/00*    (2006.01)
  *G01B 11/00*    (2006.01)
  *G06F 3/14*     (2006.01)
  *G06T 7/73*     (2017.01)
  *G01B 11/02*    (2006.01)
  *G06F 3/01*     (2006.01)
  *G06F 3/147*    (2006.01)
  *G06F 1/16*     (2006.01)
  *G06K 9/22*     (2006.01)
  *G09G 5/14*     (2006.01)
  *H04M 1/725*    (2006.01)

(56) References Cited

U.S. PATENT DOCUMENTS

| | | | |
|---|---|---|---|
| 2013/0165186 A1* | 6/2013 | Choi | H04M 1/0266 |
| | | | 455/566 |
| 2013/0245997 A1* | 9/2013 | Kasama | G01B 21/20 |
| | | | 702/167 |
| 2014/0080416 A1* | 3/2014 | Seo | H04M 1/7253 |
| | | | 455/41.2 |

FOREIGN PATENT DOCUMENTS

| | | |
|---|---|---|
| JP | 2010171673 | 8/2010 |
| JP | 2014157445 | 8/2014 |
| KR | 1020140011053 | 1/2014 |

* cited by examiner

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/002402, filed on Mar. 12, 2015, which claims the benefit of earlier filing date and right of priority to Korean Application No. 10-2014-0115603, filed on Sep. 1, 2014, the contents of which are all hereby incorporated by reference herein in their entirety.

TECHNICAL FIELD

The present invention relates to a mobile terminal and a method of controlling the same and, more particularly, to a mobile terminal capable of providing obstacle notification information using a rear laser sensor in real time and a method of controlling the same.

BACKGROUND ART

Terminals may be broadly classified into mobile/portable terminals or stationary terminals according to their mobility. Mobile terminals may also be classified into handheld terminals or vehicle mounted terminals according to whether or not a user can directly carry the terminal.

Mobile terminals have become increasingly more functional. Examples of such functions include data and voice communication, capturing images and video via a camera, recording audio, playing music files via a speaker system, and displaying images and video on a display. Some mobile terminals further include a gaming function or a multimedia player function. More recently, mobile terminals have been configured to receive broadcast and multicast signals which permit viewing of content such as videos and television programs.

As the functions of the terminal have been diversified, the terminal may be implemented in the form of a multimedia player having multiple functions such as a function for capturing images or video, a function for reproducing music or video, a gaming function and a broadcast reception function. In order to support and improve the functions of the terminal, improvement of the structure and/or software component of the terminal may be considered.

Recently, as the number of users who walk while using a mobile terminal has gradually increased, the number of accidents in which the users walk into obstacles has gradually increased. Therefore, there is a need for detection of obstacles located on a movement path of a user in real time to intuitively provide feedback to the user.

DISCLOSURE

Technical Problem

Accordingly, an object of the present invention is to address the above-noted and other problems. Another object of the present invention is to provide a mobile terminal capable of outputting obstacle notification information on a display using at least one laser sensor provided on a rear surface of a terminal body thereof, and a method of controlling the same.

Technical Solution

According to an aspect of the present invention, a mobile terminal includes a display unit configured to display an operation screen, a laser sensor configured to emit laser beams to sense an obstacle located on a movement path and a controller configured to activate the laser sensor upon detecting a predetermined event, to measure a distance from the obstacle sensed through the activated laser sensor and to control the display unit to display obstacle notification information when the measured distance is within a threshold distance.

According to another aspect of the present invention, a method of controlling a mobile terminal includes activating at least one laser sensor provided at a rear surface of a body of the terminal upon detecting a predetermined event, sensing an obstacle located on a movement path using the activated laser sensor, and measuring a distance from the sensed obstacle and displaying obstacle notification information on a display unit when the measured distance is within a threshold distance.

Advantageous Effects

The effects of the mobile terminal and the method of controlling the same according to the present invention are as follows.

According to at least one of the embodiments of the present invention, obstacle information detected using a rear laser sensor can be provided to a user in real time, thereby protecting the user from unexpected danger.

The other effects will be directly or implicitly disclosed in the detailed description of the embodiments of the present invention.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

However, the configurations according to the embodiments of this specification may also be applied to stationary terminals such as digital TVs, desktop computers, digital signage and the like, except for configurations applied to only mobile terminals.

Figure 1A:
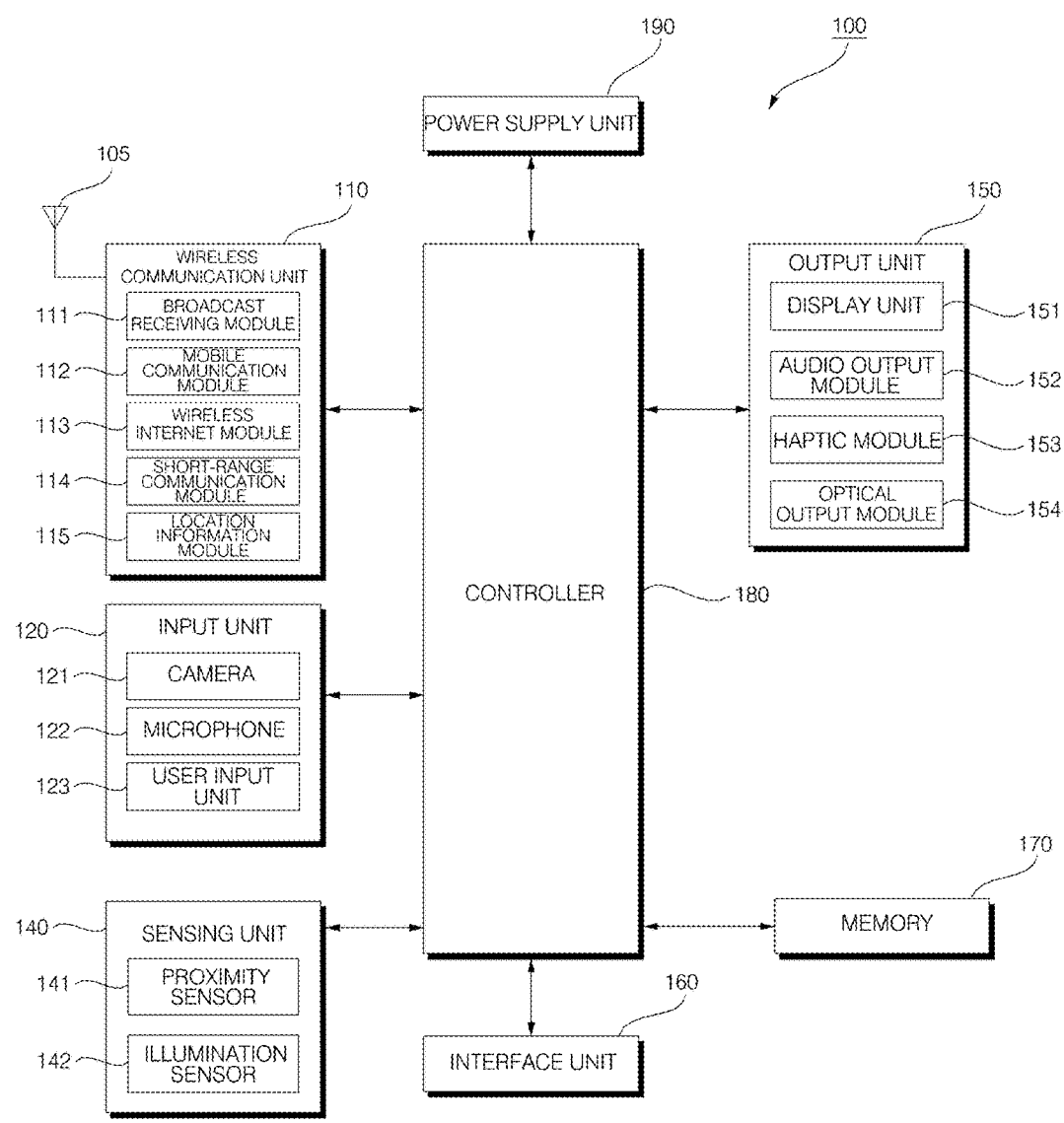
FIG. 1a is a block diagram illustrating a mobile terminal according to the present invention.
Figure 1B:
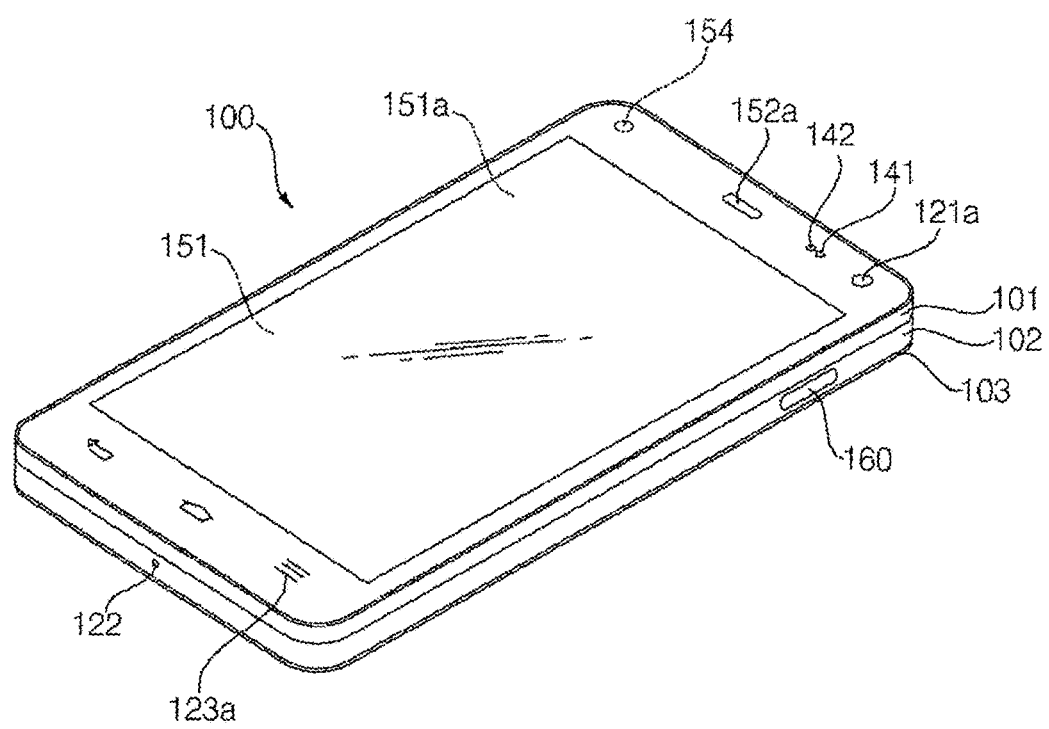
FIGS. 1b and 1c are diagrams showing an example of a mobile terminal according to the present invention when viewed in different directions.
Figure 1C:
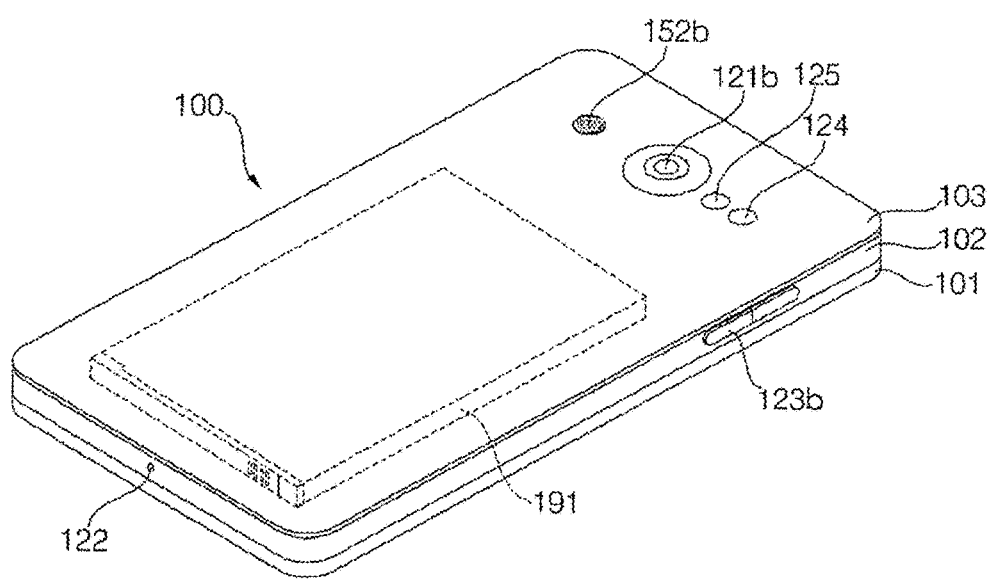

Referring to FIGS. 1*a* to 1*c*, FIG. 1*a* is a block diagram illustrating a mobile terminal according to the present invention, and FIGS. 1*b* and 1*c* are diagrams showing an example of a mobile terminal according to the present invention when viewed in different directions.

The mobile terminal 100 may include a wireless communication unit 110, an input unit 120, a sensing unit 140, an output unit 150, an interface unit 160, a memory 170, a controller 180, and a power supply 190. It is understood that all of the components shown in FIG. 1*a* is not essential to implement the mobile terminal and the mobile terminal described in this specification may include greater or fewer components.

More specifically, the wireless communication unit 110 includes one or more modules which perform communication such as wireless communication between the mobile terminal 100 and a wireless communication system, between the mobile terminal 100 and another mobile terminal, and between the mobile terminal 100 and an external server. In addition, the wireless communication unit 110 may include one or more modules for connecting the mobile terminal 100 to one or more networks.

Further, the wireless communication unit 110 may include one or more of a broadcast reception module 111, a mobile communication module 112, a wireless Internet module 113, a short-range communication module 114, and a location information module 115.

The input unit 120 includes a camera 121 or an image input unit for receiving an input image signal, a microphone 122 or an audio input unit for receiving an input audio signal, and a user input unit 123 (for example, a touch key, a push key, a mechanical key, and the like) for receiving information from a user. Audio data or image data collected by the input unit 120 may be analyzed and processed as a control command of a user.

The sensing unit 140 may include one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a fingerprint (finger scan) sensor, an ultrasonic sensor, an optical sensor (for example, a camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The mobile terminal disclosed in this specification may be configured to combine and utilize information obtained from at least two sensors of such sensors.

The output unit 150 is typically configured to output various types of information, such as audio, video, tactile output, and the like. The output unit 150 may include a display unit 151, an audio output module 152, a haptic module 153, and an optical output module 154. The display unit 151 may have an inter-layered structure or an integrated structure with a touch sensor in order to realize a touchscreen. The touchscreen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform adequate control functions associated with a connected external device, in response to the external device being connected to the interface unit 160.

The memory 170 is typically implemented to store data to support various functions of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacture or shipping, for basic functions of the mobile terminal 100 (for example, receiving a call, placing a call, receiving a message, sending a message, and the like). The application programs may be stored in the memory 170, installed in the mobile terminal 100, and executed by the controller 180 to perform an operation (or function) of the mobile terminal.

The controller 180 typically functions to control overall operation of the mobile terminal 100, in addition to the operations associated with the application programs. The controller 180 may provide or process information or functions appropriate for a user by processing signals, data, information and the like, which are input or output by the above-described components, or executing application programs stored in the memory 170.

In addition, the controller 180 may control some or all of the components illustrated in FIG. 1a, for execution of an application program stored in the memory 170. Further, the controller 180 may operate at least two of the components included in the mobile terminal 100, for execution of the application program.

The power supply 190 can be configured to receive external power or internal power in order to supply appropriate power required for operating elements and components included in the mobile terminal 100. The power supply 190 may include a battery, and the battery may be embedded in the terminal body, or be configured to be detachable from the terminal body.

At least some of the components may operate in cooperation with each other in order to implement the method of operating or controlling the mobile terminal according to the below-described various embodiments. In addition, the method of operating or controlling the mobile terminal may be implemented in the mobile terminal by executing at least one application program stored in the memory 170.

Prior to various embodiments implemented through the mobile terminal 100, the above-described components will be described in more detail with reference to FIG. 1a.

Regarding the wireless communication unit 110, the broadcast reception module 111 of the wireless communication unit 110 receives a broadcast signal and/or broadcast associated information from an external broadcast management server via a broadcast channel. The broadcast channel may include a satellite channel and a terrestrial channel. In some embodiments, two or more broadcast reception modules may be included in the mobile terminal 100, for simultaneous reception of two or more broadcast channels or for switching between broadcast channels.

The mobile communication module 112 can transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communication and to support short-range communication using Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communication between a mobile terminal 100 and a wireless communication system, between the mobile terminal 100 and another mobile terminal 100 or between the mobile terminal 100 and a network where another mobile terminal 100 (or an external server) is located, via wireless area networks. One example of the wireless area networks is a wireless personal area networks.

In some embodiments, another mobile terminal may be a wearable device, for example, a smart watch, smart glasses or a head mounted display (HMD), which is able to exchange data with the mobile terminal 100 (or otherwise cooperate with the mobile terminal 100). The short-range communication module 114 may sense (or recognize) a wearable device capable of performing communication with the mobile terminal 100 in the vicinity of the mobile terminal 100. In addition, when the sensed wearable device is a device authenticated to communicate with the mobile terminal 100, the controller 180, for example, may transmit data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to acquire the position (or the current position) of the mobile terminal. As an example, the location information module 115 includes a Global Position System (GPS) module or a Wi-Fi module. As one example, when the mobile terminal uses a GPS module, the position of the mobile terminal may be acquired using a signal sent from a GPS satellite. As another example, when the mobile terminal uses the Wi-Fi module, the position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is used to acquire the position (or the current position) of the mobile terminal and is not limited to the module for directly calculating or acquiring the position of the mobile terminal.

Next, the input unit 120 may receive video information (or signal), audio information (or signal), data or user input information. For reception of video information, the mobile terminal 100 may include one or a plurality of cameras 121. The camera 121 may process image frames of still pictures or video obtained by image sensors in a video call more or an image capture mode. The processed image frames can be displayed on the display unit 151 or stored in memory 170. In some cases, the plurality of cameras 121 may be arranged in a matrix, and the mobile terminal 100 may receive a plurality of pieces of image information having various angles or focal points through the cameras 121 arranged in the matrix. As another example, the plurality of cameras 121 may be located in a stereoscopic arrangement to acquire left and right images for implementing a stereoscopic image.

The microphone 122 processes an external acoustic signal into electrical audio data. The processed audio data may be variously used according to function (application program) executed in the mobile terminal 100. If desired, the microphone 122 may include various noise removal algorithms to remove unwanted noise generated in the process of receiving the external acoustic signal.

The user input unit 123 receives information from a user. When information is received through the user input unit 123, the controller 180 may control operation of the mobile terminal 100 in correspondence with the received information. The user input unit 123 may include one or more of a mechanical input element (for example, a mechanical key, a button located on a front and/or rear surface or a side surface of the mobile terminal 100, a dome switch, a jog wheel, a jog switch, and the like) or a touch input element. As one example, the touch input element may be a virtual key, a soft key or a visual key, which is displayed on a touchscreen through software processing, or a touch key which is located on the mobile terminal at a location other than the touchscreen. On the other hand, the virtual key or the visual key may be displayed on the touchscreen in various shapes, for example, graphics, text, icon, video, or a combination thereof.

The sensing unit 140 senses one or more of internal information of the mobile terminal, surrounding environment information of the mobile terminal, user information or the like, and generates a sensing signal corresponding thereto. The controller 180 may control operation of the mobile terminal 100 or perform data processing, a function or an operation associated with an application program installed in the mobile terminal 100, based on the sensing signal. The sensing unit 140 may be implemented using any of a variety of sensors, some of which will now be described in more detail.

First, the proximity sensor 141 may include a sensor to sense presence or absence of an object approaching or located near a predetermined detection surface, by using an electromagnetic field, infrared light, or the like without a mechanical contact. The proximity sensor 141 may be arranged at an inner region of the mobile terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitive type proximity sensor, a magnetic type proximity sensor, an infrared proximity sensor, and the like. When the touchscreen is a capacitive touchscreen, the proximity sensor 141 can sense proximity of an object due to change in an electromagnetic field caused by approach of the object with conductivity. In this case, the touchscreen (touch sensor) may also be categorized as a proximity sensor.

For convenience of description, the term "proximity touch" will often be referred to herein to denote the scenario in which an object is positioned to be proximate to the touchscreen without contacting the touchscreen. The term "contact touch" will often be referred to herein to denote the scenario in which an object contacts the touchscreen. A position corresponding to the proximity touch of the object relative to the touchscreen will correspond to a position where the object is perpendicular to the touchscreen. The proximity sensor 141 may sense proximity touch, and proximity touch patterns (for example, proximity touch distance, proximity touch direction, proximity touch speed, proximity touch time, proximity touch position, proximity touch moving status, and the like). In general, the controller 180 may process data (or information) corresponding to proximity touch and proximity touch patterns sensed by the proximity sensor 141, and output visual information corresponding to the processed data on the touchscreen. In addition, the controller 180 can control the mobile terminal 100 to execute different operations or process different data (or information) according to whether a touch of the same point on the touchscreen is either a proximity touch or a contact touch.

A touch sensor can sense a touch (touch input) applied to the touchscreen (or the display unit 151) using any of a variety of touch methods such as resistive, capacitive, infrared, ultrasonic and magnetic field methods.

As one example, the touch sensor may be configured to convert changes in pressure applied to a specific part of the display unit 151 or convert change in capacitance occurring at a specific part of the display unit 151 into electrical input signals. The touch sensor may also be configured to sense not only a touched position and a touched area, but also touch pressure and/or touch capacitance of a touch object. The touch object is generally used to apply touch input to the touch sensor. Examples of typical touch objects include a finger, a touch pen, a stylus, a pointer, or the like.

When touch input is sensed by a touch sensor, a signal(s) corresponding thereto may be transmitted to a touch controller. The touch controller may process the received signal(s), and then transmit corresponding data to the controller 180. Accordingly, the controller 180 may sense which region of the display unit 151 has been touched. Here, the touch controller may be a component included separately from the controller 180 or the controller 180.

In some embodiments, the controller 180 may execute the same or different controls according to a type of touch object that touches the touchscreen (or a touch key provided in addition to the touchscreen). Whether to execute the same or different controls according to the type of the touch object may be decided based on a current operating state of the mobile terminal 100 or a currently executed application program, for example.

The touch sensor and the proximity sensor may be implemented individually, or in combination, to sense various types of touches such as a short (or tap) touch, a long touch, a multi-touch, a drag touch, a flick touch, a pinch-in touch, a pinch-out touch, a swipe touch, a hovering touch, and the like.

If desired, an ultrasonic sensor may recognize position information of a touch object using ultrasonic waves. The controller 180, for example, may calculate a position of a wave generation source based on information sensed by an illumination sensor and a plurality of ultrasonic sensors.

Light is much faster than ultrasonic waves, that is, the time for the light to reach the optical sensor is much shorter than the time for the ultrasonic wave to reach the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 included in the input unit 120 typically includes at least one a camera sensor (CCD, CMOS etc.), a photo sensor (or image sensors), and a laser sensor.

The camera 121 and a laser sensor may be combined to detect a touch of an object to be sensed with respect to a 3D stereoscopic image. The photo sensor may be laminated on the display device. The photo sensor may be configured to scan movement of the object to be sensed in proximity to the touchscreen. In more detail, the photo sensor may include photodiodes and transistors (TRs) in rows and columns to scan the object placed on the photo sensor using an electrical signal which changes according to the quantity of applied light. Namely, the photo sensor may calculate the coordinates of the object to be sensed according to change in amount of light, thereby obtaining position information of the object to be sensed.

The display unit 151 is generally configured to display (output) information processed in the mobile terminal 100. For example, the display unit 151 may display execution screen information of an application program executed by the mobile terminal 100 or user interface (UI) and graphical user interface (GUI) information in response to the execution screen information.

In some embodiments, the display unit 151 may be implemented as a stereoscopic display unit for displaying stereoscopic images.

A typical stereoscopic display unit may employ a 3D display scheme such as a stereoscopic scheme (glasses scheme), an auto-stereoscopic scheme (glassless scheme), a projection scheme (holographic scheme), or the like.

The audio output module 152 is generally configured to output audio data received from the wireless communication unit 110 or stored in the memory 170 in a call signal reception mode, a call mode, a record mode, a voice recognition mode, a broadcast reception mode, and the like. The audio output module 152 can output an audio signal related to a particular function (e.g., a call signal reception sound, a message reception sound, etc.) performed by the mobile terminal 100. The audio output module 152 may also include a receiver, a speaker, a buzzer, or the like.

A haptic module 153 can be configured to generate various tactile effects that a user feels. A typical example of a tactile effect generated by the haptic module 153 is vibration. The strength, pattern and the like of the vibration generated by the haptic module 153 can be controlled by user selection or setting of the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, touch to the skin, contact of an electrode, electrostatic force, an effect of reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating event generation using light of a light source of the mobile terminal 100. Examples of events generated in the mobile terminal 100 may include message reception, call signal reception, a missed call, an alarm, a schedule notice, email reception, information reception through an application, and the like.

A signal output by the optical output module 154 may be implemented in such a manner that the mobile terminal emits monochromatic light or light with a plurality of colors through a front surface or a rear surface thereof. The signal output may be terminated as the mobile terminal senses that a user has checked the generated event, for example.

The interface unit 160 serves as an interface for external devices to be connected with the mobile terminal 100. For example, the interface unit 160 can receive data from an external device or receive power to transfer the data or power to elements and components within the mobile terminal 100, or transmit internal data of the mobile terminal 100 to such an external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores a variety of information for granting use authority of the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal 100 therethrough. Various command signals or power input from the cradle may operate as signals for recognizing that the mobile terminal 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touchscreen.

The memory 170 may include one or more types of storage media including a flash memory, a hard disk, a solid state drive, a silicon disk drive, a multimedia card micro type memory, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disc, and the like. The mobile terminal 100 may also be operated in relation to a network storage device that performs the storage function of the memory 170 over the Internet.

As described above, the controller 180 may typically control operation related to the application program and the general operations of the mobile terminal 100. For example, the controller 180 may set or release a lock state for restricting a user from inputting a control command with respect to applications when a status of the mobile terminal meets a preset condition.

The controller 180 can also perform control and processing associated with voice calls, data communication, video calls, and the like, or perform pattern recognition processing to recognize handwriting input or picture drawing input performed on the touchscreen as characters or images, respectively. In addition, the controller 180 can control one or a combination of these components in order to implement various exemplary embodiments disclosed herein.

The power supply 190 receives external power or internal power and supplies the appropriate power required to operate respective elements and components included in the mobile terminal 100, under control of the controller 180. The power supply 190 may include a battery, which is typically rechargeable or be detachably coupled to the terminal body for charging.

The power supply 190 may include a connection port. The connection port may be configured as one example of the interface unit 160 to which an external charger for supplying power to recharge the battery is electrically connected.

As another example, the power supply 190 may be configured to recharge the battery in a wireless manner without use of the connection port. In this example, the power supply 190 can receive power from an external wireless power transmitter, using at least one of an inductive coupling method which is based on magnetic induction or a magnetic resonance coupling method which is based on electromagnetic resonance.

Various embodiments described herein may be implemented in a computer-readable medium or similar medium using, for example, software, hardware, or any combination thereof.

Referring now to FIGS. 1b and 1c, the mobile terminal 100 include a bar-type terminal body. However, the mobile terminal 100 may alternatively be implemented in any of a variety of different configurations, such as watch-type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile. However, such teachings with regard to a particular type of mobile terminal will generally apply to other types of mobile terminals as well.

The terminal body may be understood to refer to the mobile terminal 100 as at least one assembly.

The mobile terminal 100 generally includes a case (for example, frame, housing, cover, and the like) forming the appearance of the terminal. In this embodiment, the mobile terminal 100 includes a front case 101 and a rear case 102. Various electronic components are incorporated into a space formed between the front case 101 and the rear case 102. At least one middle case may be additionally positioned between the front case 101 and the rear case 102.

The display unit 151 is located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components mounted to the rear case 102 include a detachable battery 191, an identification module, a memory card, and the like. A rear cover 103 covering the electronic components may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this example, a mobile terminal 100 having a unified body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 includes a display unit 151, first and second audio output modules 152a and 152b, a proximity sensor 141, an illumination sensor 142, an optical output module 154, first and second cameras 121a and 121b, first and second manipulation units 123a/123b, a microphone 122, an interface unit 160 and the like.

The mobile terminal 100 shown in FIGS. 1b and 1c will be described. The display unit 151, the first audio output module 152a, the proximity sensor 141, an illumination sensor 142, the optical output module 154, the first camera 121a and the first manipulation unit 123a are arranged in a front surface of the terminal body, the second manipulation unit 123b, the microphone 122 and the interface unit 160 are arranged in a side surface of the terminal body, and the second audio output modules 152b and the second camera 121b are arranged in a rear surface of the terminal body.

However, it is to be understood that alternative arrangements are possible within the teachings of the present disclosure. Some components may be omitted or rearranged. For example, the first manipulation unit 123a may not be located on the front surface of the terminal body, and the second audio output module 152b may not located on the rear surface of the terminal body but may be located on the side surface of the terminal body.

The display unit 151 displays (outputs) information processed in the mobile terminal 100. The display unit 151 may display execution screen information of an application program executed in the mobile terminal 100 or user interface (UI) or graphical user interface (GUI) information according to such execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Two or more display units 151 may be used according to implementation of the mobile terminal 100. For instance, a plurality of the display units may be arranged on one side of the mobile terminal 100, either spaced apart from each other or integrated, or these display units may be arranged on different surfaces of the mobile terminal 100.

The display unit 151 may also include a touch sensor which senses a touch input received at the display unit 151 so as to receive a control command in a touching manner. When a touch is input to the display unit 151, the touch sensor may be configured to sense this touch and the controller 180 may generate a control command corresponding to the touch. The content which is input in the touching manner may be text or a numerical value, or a menu item which can be indicated or designated in various modes.

The touch sensor may be configured in the form of a film having a touch pattern, disposed between the window 151a and a display (not shown) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touchscreen together with the touch sensor. Here, the touchscreen may serve as the user input unit 123 (see FIG. 1a). Therefore, the touchscreen may replace at least some of the functions of the first manipulation unit 123a.

The first audio output module 152a may be implemented in the form of a receiver to deliver telephone conversation to ears of a user or a loud speaker to output various alarm sounds, multimedia audio reproduction sounds, and the like.

The window 151a of the display unit 151 will typically include an audio hole to allow sound generated by the first audio output module 152a to pass. The present invention is not limited thereto and sound may be released along an assembly gap between the structural bodies (for example, a gap between the window 151a and the front case 101). In this case, a hole independently formed to output sound may not be seen or is otherwise hidden in terms of appearance, thereby further simplifying the appearance of the mobile terminal 100.

The optical output module 154 can be configured to output light for indicating event generation. Examples of such events include message reception, call signal reception, a missed call, an alarm, a schedule notice, email reception, information reception through an application, and the like. When a user has checked a generated event, the controller 180 can control the optical output unit 154 to stop light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user in order to receive a command for controlling operation of the mobile terminal 100. The first and second manipulation units 123a and 123b may also be commonly referred to as a manipulation portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

Although the first manipulation unit 123a is a touch key in this figure, the present invention is not limited thereto. For example, the first manipulation unit 123a may include a push key (mechanical key) or a combination of a push key and a touch key.

Input received at the first and second manipulation units 123a and 123b may be used in various ways. For example, the first manipulation unit 123a may receive commands such as a menu, home key, cancel, search, or the like, and the second manipulation unit 123b may receive commands for controlling a volume level output from the first or second audio output modules 152a or 152b and switching a touch recognition mode of the display unit 151.

As another example of the user input unit 123, a rear input unit (not shown) may be located on the rear surface of the terminal body. The rear input unit can be manipulated by a user to receive commands for controlling operation of the mobile terminal 100. The received commands may be set in a variety of different ways. For example, a command such as power on/off, start, end or scroll, a command for controlling a volume level output from the first or second audio output modules 152a or 152b, a command for switching to a touch recognition mode of the display unit 151, and the like may be received. The rear input unit may be configured to permit touch input, push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate the same using a forefinger when the user grabs the terminal body with one hand. The present invention is not limited thereto and the position of the rear input unit may be changed.

If the rear input unit is provided located on the rear surface of the terminal body, a new user interface using the same may be implemented. In addition, the above-described touchscreen or rear input unit may replace at least some of the functions of the first manipulation unit 123a located on the front surface of the terminal body. As such, if the first manipulation unit 123a is not located on the front surface of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 receives user's voice or the other sounds. If desired, multiple microphones 122 may be provided to receive stereo sound.

The interface unit 160 may serve as an interface between the mobile terminal 100 and external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as a Subscriber Identity Module (SIM), a User Identity Module (UIM), or a memory card for information storage.

The second camera 121b is located at the rear side of the terminal body and includes an image capturing direction that is substantially opposite to the image capture direction of the first camera unit 121a.

The second camera 121b can include a plurality of lenses arranged along at least one line. The plurality of lenses may also be arranged in a matrix. The cameras may be referred to as an "array camera." When the second camera 121b is implemented as an array camera, images may be captured in various manners using the plurality of lenses, and images with better quality may be acquired.

A flash 124 may be provided adjacent to the second camera 121b. When an image of a subject is captured with the camera 121b, the flash 124 may illuminate the subject.

The laser sensor 125 may also be provided adjacent to the second camera 121b. The laser sensor 125 may perform a function for measuring a distance between the second camera 121b and a subject using a laser, for rapid processing of autofocus, and providing the distance to the second camera 121b or the controller 180. The laser sensor 125 having such a function may be referred to as a "laser autofocus sensor".

In addition, the laser sensor 125 performs a function for sensing an obstacle located on a movement path of a user using a laser. A plurality of laser sensors 125 for performing such a function may be provided at the rear surface of the terminal body and may not be provided adjacent to the second camera 121b.

The second audio output module 152b may be further located on the terminal body. The second audio output module 152b may implement stereophonic sound functions in conjunction with the first audio output module 152a, and may be also used to implement a speakerphone mode for call communication.

At least one antenna for wireless communication may be located on the terminal body. The antenna may be installed in the terminal body or formed in the case. For example, an antenna which configures a part of the broadcast reception module 111 may be retractable into the terminal body. Alternatively, an antenna may be formed in a film shape to be attached to an inner surface of the rear cover 103, or a case including a conductive material may function as an antenna.

The terminal body includes a power supply (190; see FIG. 1a) for supplying power to the mobile terminal 100. The power supply 190 may include a battery 191, which is mounted in the terminal body or detachably coupled to the outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is coupled to the rear case 102 to shield the battery 191, to prevent separation of the battery 191, and to protect the battery 191 from external impact or from foreign materials. When the battery 191 is detachable from the terminal body, the rear case 103 may be detachably coupled to the rear case 102.

An accessory for protecting the mobile terminal 100 or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the functionality of the mobile terminal 100. Another example of the accessory is a touch pen for assisting or extending touch input to a touchscreen.

Up to now, the configuration of the mobile terminal 100 according to the present invention has been described with reference to FIGS. 1a to 1c. Hereinafter, a mobile terminal capable of providing obstacle notification information using a rear laser sensor in real time and a method of controlling the same according to an embodiment of the present invention will be described in detail.

Figure 2:
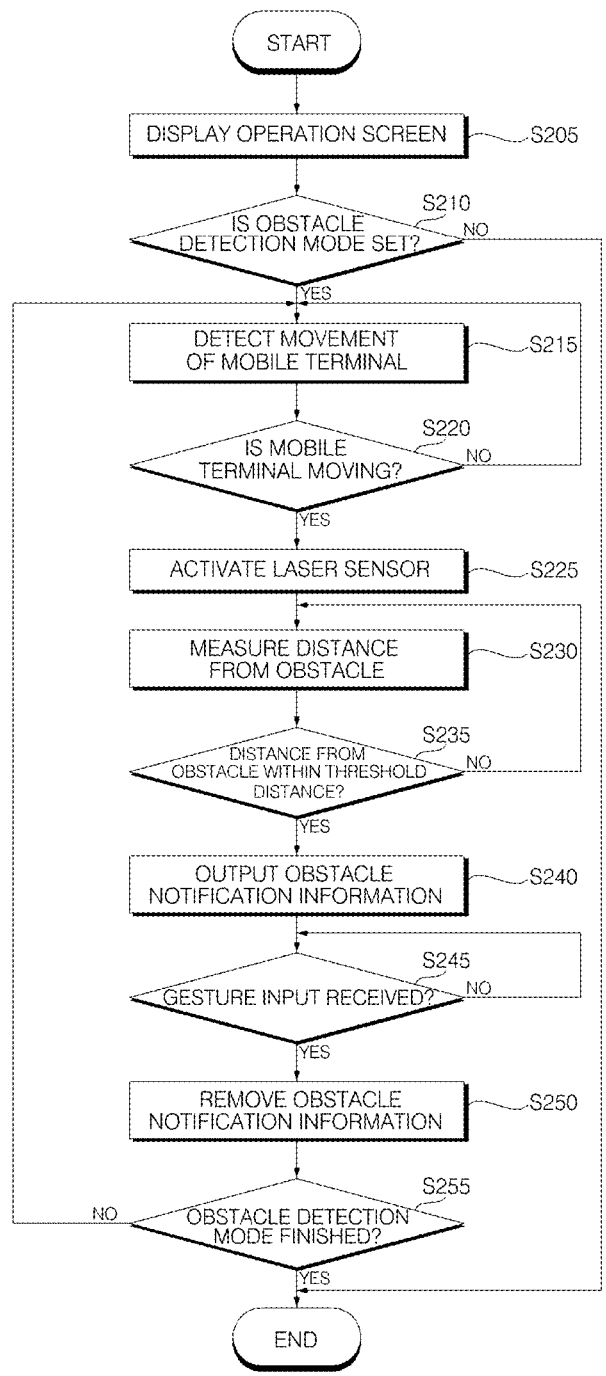
FIG. 2 is a flowchart illustrating operation of a mobile terminal according to a first embodiment of the present invention.

FIG. 2 is a flowchart illustrating operation of a mobile terminal according to a first embodiment of the present invention.

Referring to FIG. 2, the controller 180 displays an operation screen corresponding to a menu or operation selected according to a user command on the display unit 151 (S205). At this time, examples of the displayed operation screen may include a home screen, an app screen, a message screen, a call communication screen, an image or video viewer screen, a broadcast screen, a map screen, a webpage screen, a specific application execution screen, etc.

In a state of displaying such an operation screen, when an obstacle detection mode is set by manipulating a setting menu (S210), the controller 180 detects motion information of the mobile terminal 100 using at least one of an acceleration sensor, a gyroscope sensor, a motion sensor and a GPS sensor (S215).

If it is detected that the mobile terminal 100 is moving, the controller 180 activates at least one laser sensor 125 provided at the rear surface of the terminal body (S225).

The controller 180 senses an obstacle located on the movement path of a user using the activated laser sensor 125 and measures a distance from the sensed obstacle (S230). At this time, the controller 180 may change the detection period of the laser sensor 125 according to the movement speed of the mobile terminal 100. That is, if the movement speed of the mobile terminal 100 increases, the controller 180 may decrease the detection period of the laser sensor 125 to more accurately sense the obstacle.

If the distance from the obstacle sensed using a laser is within a threshold distance (S235), the controller 180 displays predetermined obstacle notification information on the display unit 151 (S240). At this time, the controller 180 may provide different notification screen effects to the display unit 151 according to the type, shape and approach speed of the sensed obstacle.

In addition, the controller 180 may output vibration effects through the haptic module 153 or output warning sound through the audio output module 152, along with visual obstacle notification information.

When predetermined gesture input is received (S245) while the obstacle notification information is being output, the controller 180 performs control to make the obstacle notification information disappear from the screen (S250). If the obstacle sensed using the laser disappears, the controller 180 may perform control to make the obstacle notification information disappear from the screen.

Thereafter, if the obstacle detection mode is finished by manipulating the setting menu (S255), the controller 180 finishes an obstacle detection process according to the first embodiment of the present invention. In contrast, if the obstacle detection mode is not finished (S255), the controller 180 repeatedly performs operation of steps 215 to 250.

Figure 3:
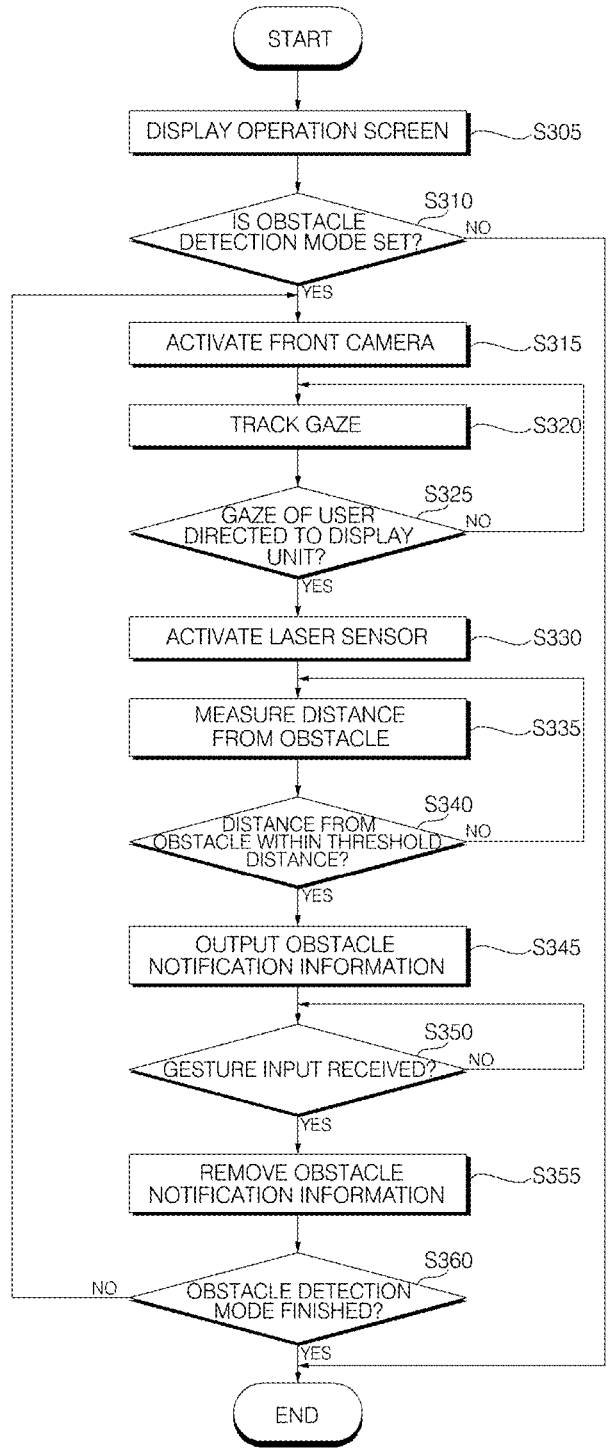
FIG. 3 is a flowchart illustrating operation of a mobile terminal according to a second embodiment of the present invention.

FIG. 3 is a flowchart illustrating operation of a mobile terminal according to a second embodiment of the present invention.

Referring to FIG. 3, the controller 180 displays an operation screen corresponding to a menu or operation selected according to a user command on the display unit 151 (S305). At this time, examples of the displayed operation screen may include a home screen, an app screen, a message screen, a call communication screen, an image or video viewer screen, a broadcast screen, a map screen, a webpage screen, a specific application execution screen, etc.

In a state of displaying such an operation screen, when an obstacle detection mode is set by manipulating a setting menu (S310), the controller 180 activates the camera 121a provided at the front surface of the terminal body (S315).

The controller 180 performs gaze tracking using a user image acquired through the front camera 121a (S320). Gaze tracking refers to technology for recognizing the pupils of a user and tracking the gaze position of the user according to the result of analyzing the image input through the camera. Using gaze tracking, the gaze position of the user can be checked in real time.

The controller 180 checks whether the gaze of the user is directed to the display unit 151 using the gaze tracking technology (S325).

If it is checked that the gaze of the user is directed to the display unit, the controller 180 activates at least one laser sensor 125 provided at the rear surface of the terminal body (S330).

The controller 180 senses an obstacle located on the movement path of the user using the activated laser sensor 125 and measures a distance from the sensed obstacle (S335). At this time, the controller 180 may change the detection period of the laser sensor 125 according to the movement speed of the mobile terminal 100.

If the distance from the obstacle sensed through a laser is within a threshold distance (S340), the controller 180 displays predetermined obstacle notification information on the display unit 151 (S345). At this time, the controller 180 may provide different notification screen effects to the display unit 151 according to the type, shape and approach speed of the sensed obstacle.

In addition, the controller 180 may output vibration effects through the haptic module 153 or output warning sound through the audio output module 152, along with visual obstacle notification information.

When a predetermined time has elapsed without input (S350) while the obstacle notification information is being output, the controller 180 performs control to make the obstacle notification information disappear from the screen (S355). If the obstacle sensed through the laser disappears, the controller 180 may perform control to make the obstacle notification information disappear from the screen.

Thereafter, if the obstacle detection mode is finished by manipulating the setting menu (S360), the controller 180 finishes an obstacle detection process according to the second embodiment of the present invention. In contrast, if the obstacle detection mode is not finished (S360), the controller 180 repeatedly performs operation of steps 315 to 355.

As described above, the mobile terminal according to the first and second embodiments of the present invention can provide information on an obstacle detected through the rear laser sensor to the user in real time, thereby protecting the user from unexpected danger.

Figure 4:
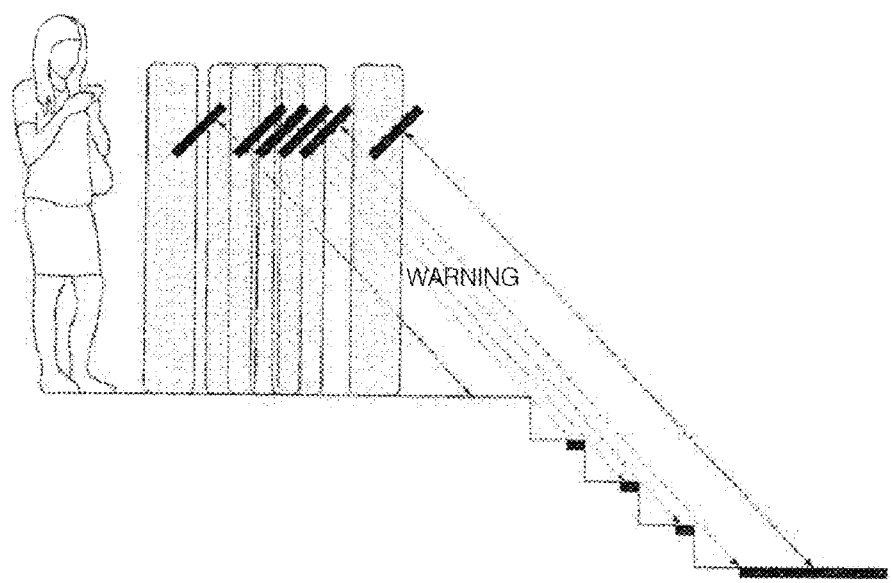
FIGS. 4 and 5 are views referred to for describing a scenario of notifying a user of an obstacle located on a movement path in real time using a rear laser sensor.
Figure 5:
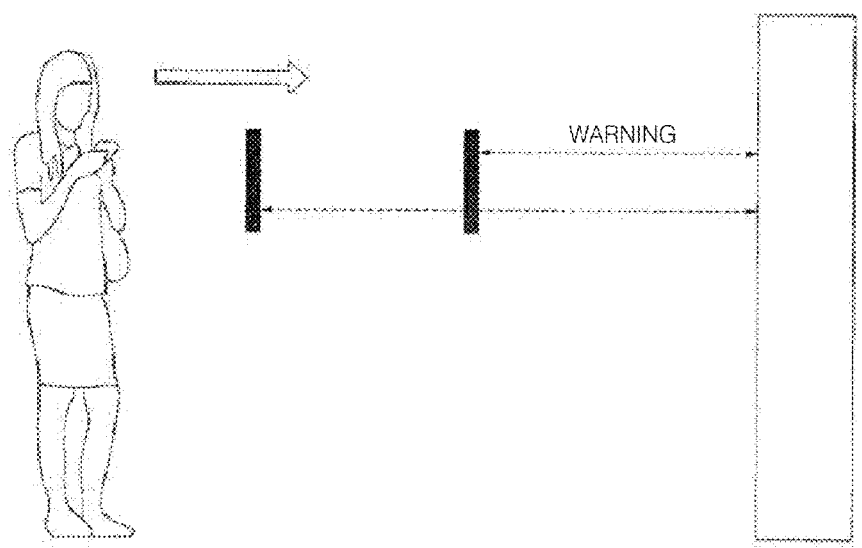

FIGS. 4 and 5 are views referred to for describing a scenario of notifying a user of an obstacle located on a movement path in real time using a rear laser sensor.

Referring to FIG. 4, when the user moves while utilizing the terminal, the mobile terminal 100 may sense change in the ground through distance measurement using the rear laser sensor 125. If an obstacle such as stairs is detected, the mobile terminal 100 may output the predetermined obstacle notification information on the display unit 151.

If an obstacle is no longer detected as the result of continuous measurement of the rear laser sensor 125, the mobile terminal 100 recognizes that the stairs have been finished and switches to a normal screen mode. That is, the mobile terminal 100 performs control to make the predetermined obstacle notification information disappear.

Meanwhile, referring to FIG. 5, when the user moves while utilizing the terminal, the mobile terminal 100 may sense an obstacle located at the front thereof through distance measurement using the rear laser sensor 125. Therefore, if an obstacle such as a telephone pole is detected, the mobile terminal 100 may output the predetermined notification information on the display unit 151.

In order to satisfy the above-described two scenarios, at least one laser sensor 125 provided at the rear surface of the terminal body may be configured to emit laser beams not only toward the front thereof but also toward the ground.

Figure 6:
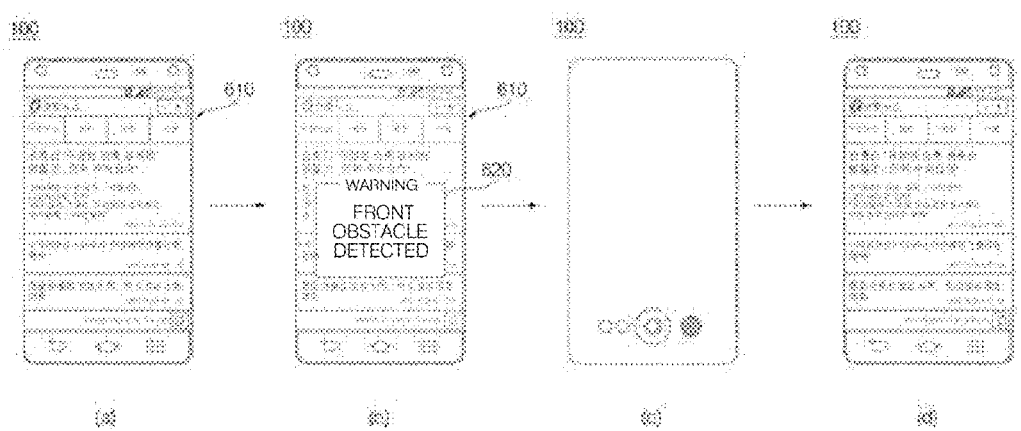
FIG. 6 is a view referred to for describing operation of a mobile terminal for making obstacle notification information disappear after displaying obstacle notification information upon detecting an obstacle while moving.

FIG. 6 is a view referred to for describing operation of a mobile terminal for making obstacle notification information disappear after displaying obstacle notification information upon detecting an obstacle while moving.

Referring to FIG. 6, the mobile terminal 100 displays a webpage screen 610 on the display unit 151 according to a user command.

If an obstacle is detected through the rear laser sensor 125 when moving while viewing the webpage screen 610, the mobile terminal 100 displays obstacle notification information 620 on the display unit 151 as shown in (b) of FIG. 6. Therefore, the user of the mobile terminal 100 may intuitively recognize that an obstacle is located at the front thereof.

If predetermined gesture input is received in a state of continuously displaying the obstacle notification information 620, the mobile terminal 100 may make the obstacle notification information disappear from the screen. At this time, the predetermined gesture input may be gesture input of rotating the terminal body by 180 degrees, without being limited thereto.

Figure 7:
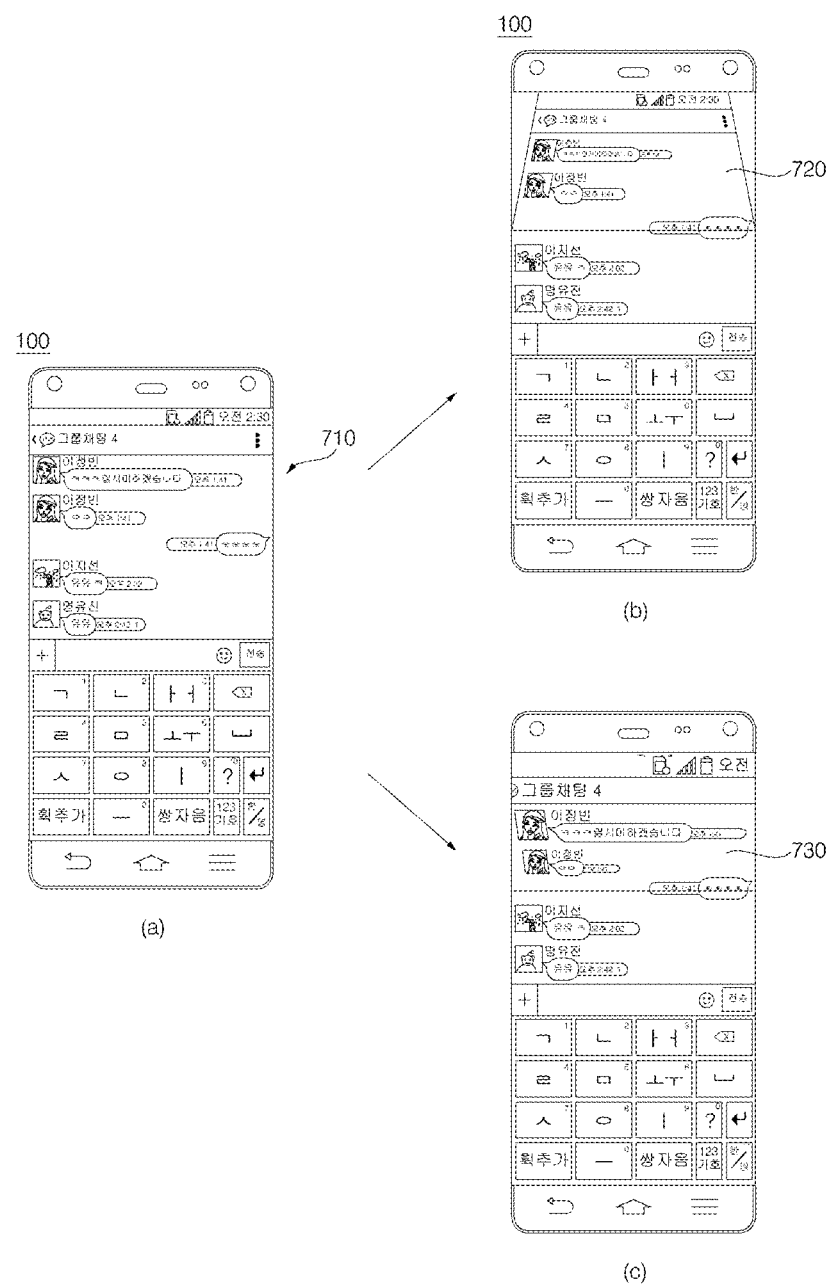
FIG. 7 is a view referred to for describing operation of a mobile terminal for providing different screen effects according to height of an obstacle.

FIG. 7 is a view referred to for describing operation of a mobile terminal for providing different screen effects according to height of an obstacle.

Referring to FIG. 7, the mobile terminal 100 displays a message screen 710 on the display unit 151 according to a user command.

If an obstacle (that is, stairs) is detected through the rear laser sensor 125 when moving while viewing the messenger screen 710, the mobile terminal 100 detects change in height of the ground based on the result of measuring the distance from the obstacle.

If a bent portion having a height lower than that of the ground is recognized as the detected result, the mobile terminal 100 may display the screen effect 720 shown in (b) of FIG. 7 on the display unit 151. Therefore, the user of the mobile terminal 100 may intuitively recognize that the descending stairs are present through the screen effect 720.

If a bent portion having a height higher than that of the ground is recognized as the detected result, the mobile terminal 100 may display the screen effect 730 shown in (c) of FIG. 7 on the display unit 151. Therefore, the user of the mobile terminal 100 may intuitively recognize that the ascending stairs are present through the screen effect 730.

Figure 8:
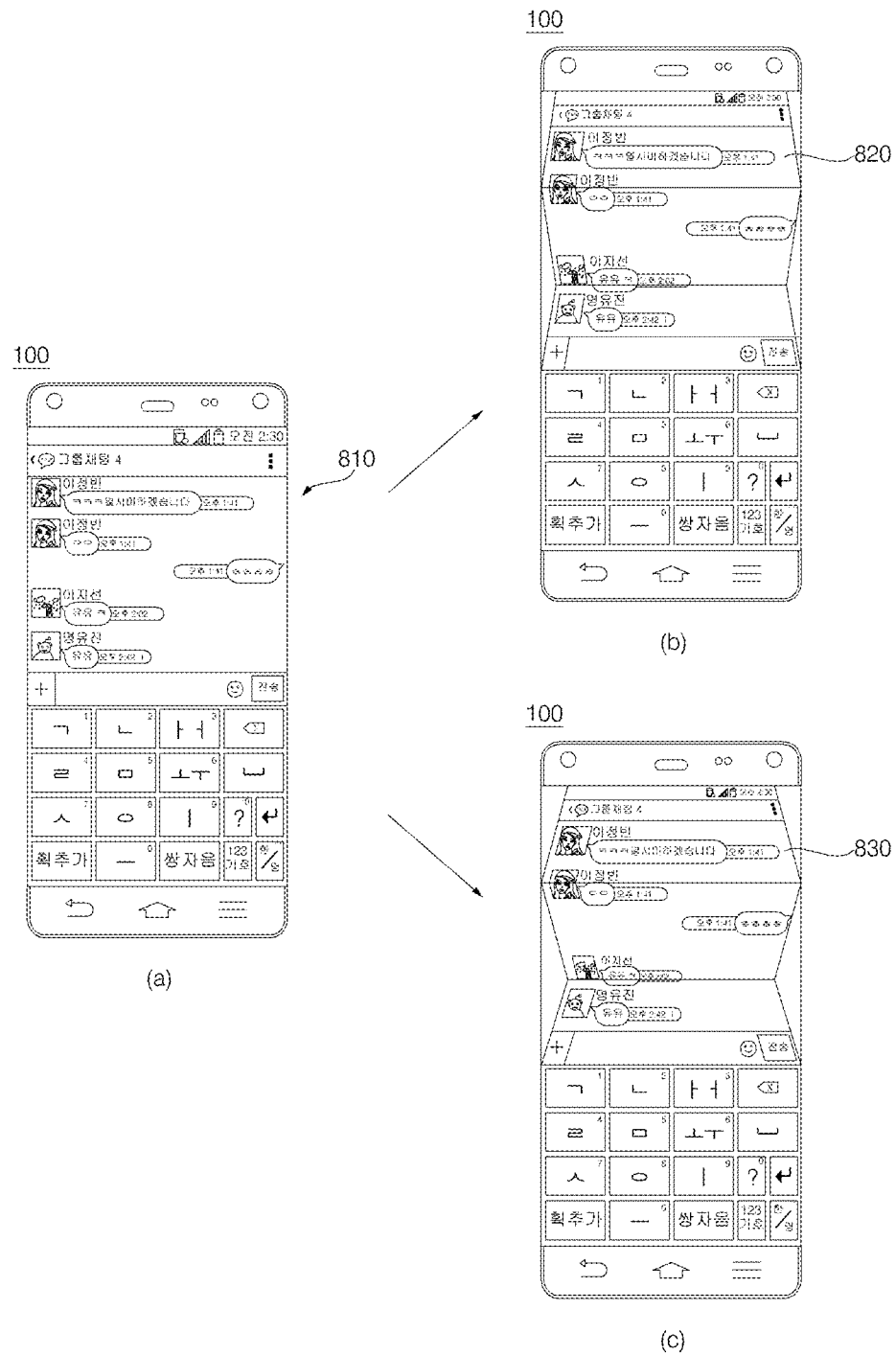
FIG. 8 is a view referred to for describing operation of a mobile terminal for providing different screen effects according to depth of a bent portion of an obstacle.

FIG. 8 is a view referred to for describing operation of a mobile terminal for providing different screen effects according to depth of a bent portion of an obstacle.

Referring to FIG. 8, the mobile terminal 100 displays a message screen 710 on the display unit 151 according to a user command.

If an obstacle (that is, stairs) is detected through the rear laser sensor 125 when moving while viewing the messenger screen 810, the mobile terminal 100 detects the depth of the bent portion of the obstacle based on the result of measuring the distance from the obstacle.

If it is recognized that the depth of the bent portion of the obstacle is small as the detected result, the mobile terminal 100 may display a screen effect 820 shown in (b) of FIG. 8 on the display unit 151. Here, the screen effect 820 may refer to a screen effect of bending and displaying the messenger screen in the form of stairs and displaying a small distance between bent surfaces. Therefore, the user of the mobile terminal 100 may intuitively recognize that the depth of the bent portion of the stairs is small through the screen effect 820.

If it is recognized that the depth of the bent portion of the obstacle is large as the detected result, the mobile terminal 100 may display a screen effect 830 shown in (c) of FIG. 8 on the display unit 151. Here, the screen effect 820 may refer to a screen effect of bending and displaying the messenger screen in the form of stairs and displaying a large distance between bent surfaces. Therefore, the user of the mobile terminal 100 may intuitively recognize that the depth of the bent portion of the stairs is large through the screen effect 830.

Figure 9:
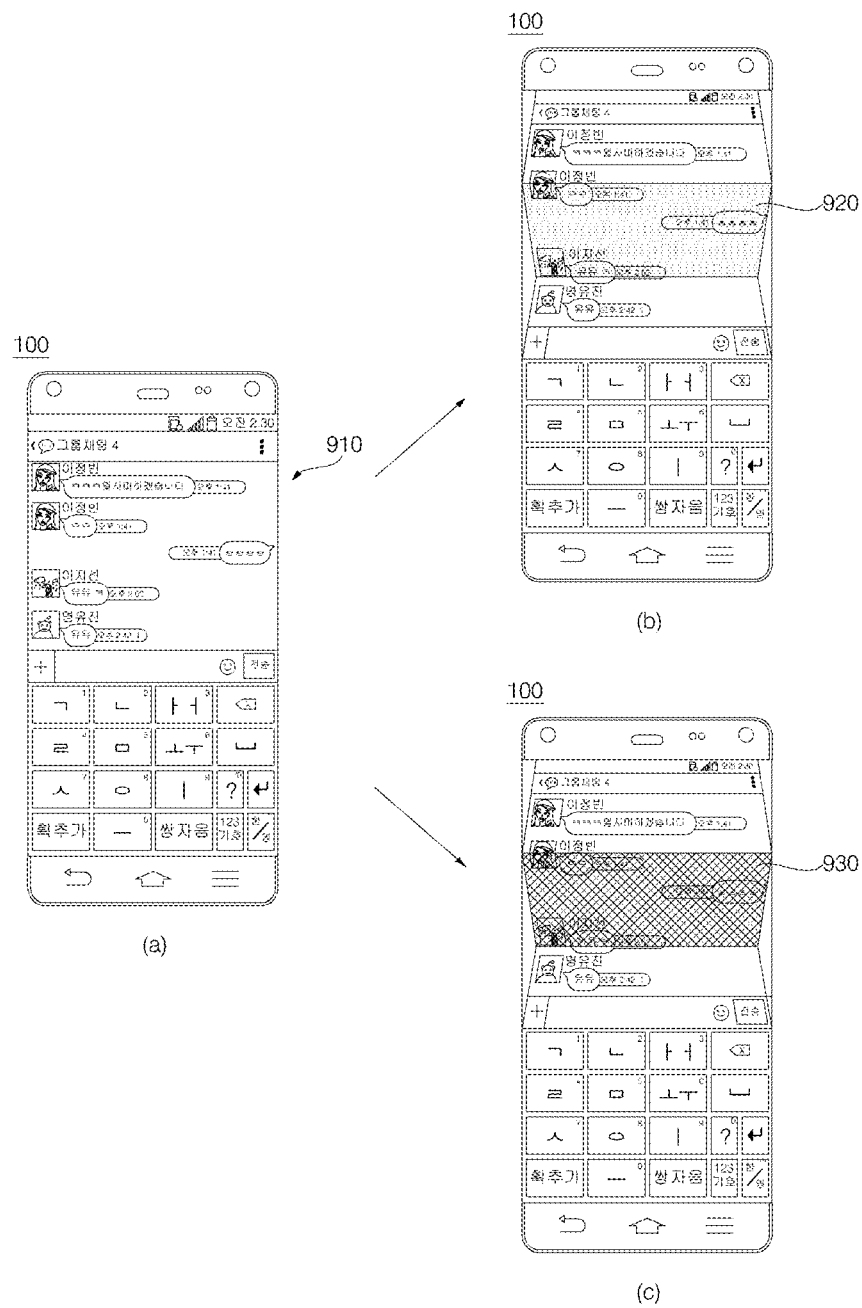
FIG. 9 is a view referred to for describing operation of a mobile terminal for outputting different colors according to the height of the obstacle.

FIG. 9 is a view referred to for describing operation of a mobile terminal for outputting different colors according to the height of the obstacle.

Referring to FIG. 9, the mobile terminal 100 displays a message screen 910 on the display unit 151 according to a user command.

If an obstacle (that is, stairs) is detected through the rear laser sensor 125 when moving while viewing the messenger screen 910, the mobile terminal 100 detects change in height of the ground based on the result of measuring the distance from the obstacle.

If a bent portion having a height lower than that of the ground is recognized as the detected result, the mobile terminal 100 may display a screen effect 920 shown in (b) of FIG. 9 on the display unit 151. Here, the screen effect 920 may refer to a screen effect of bending and displaying the messenger screen in the form of stairs and displaying a recessed portion of the stairs with a first color. Therefore, the user of the mobile terminal 100 may intuitively recognize that descending stairs are present through the screen effect 920.

If a bent portion having a height higher than that of the ground is recognized as the detected result, the mobile terminal 100 may display a screen effect 930 shown in (c) of FIG. 9 on the display unit 151. Here, the screen effect 930 may refer to a screen effect of bending and displaying the messenger screen in the form of stairs and displaying a protruding portion of the stairs with a second color different from the first color. Therefore, the user of the mobile terminal 100 may intuitively recognize that ascending stairs are present through the screen effect 930.

Figure 10:
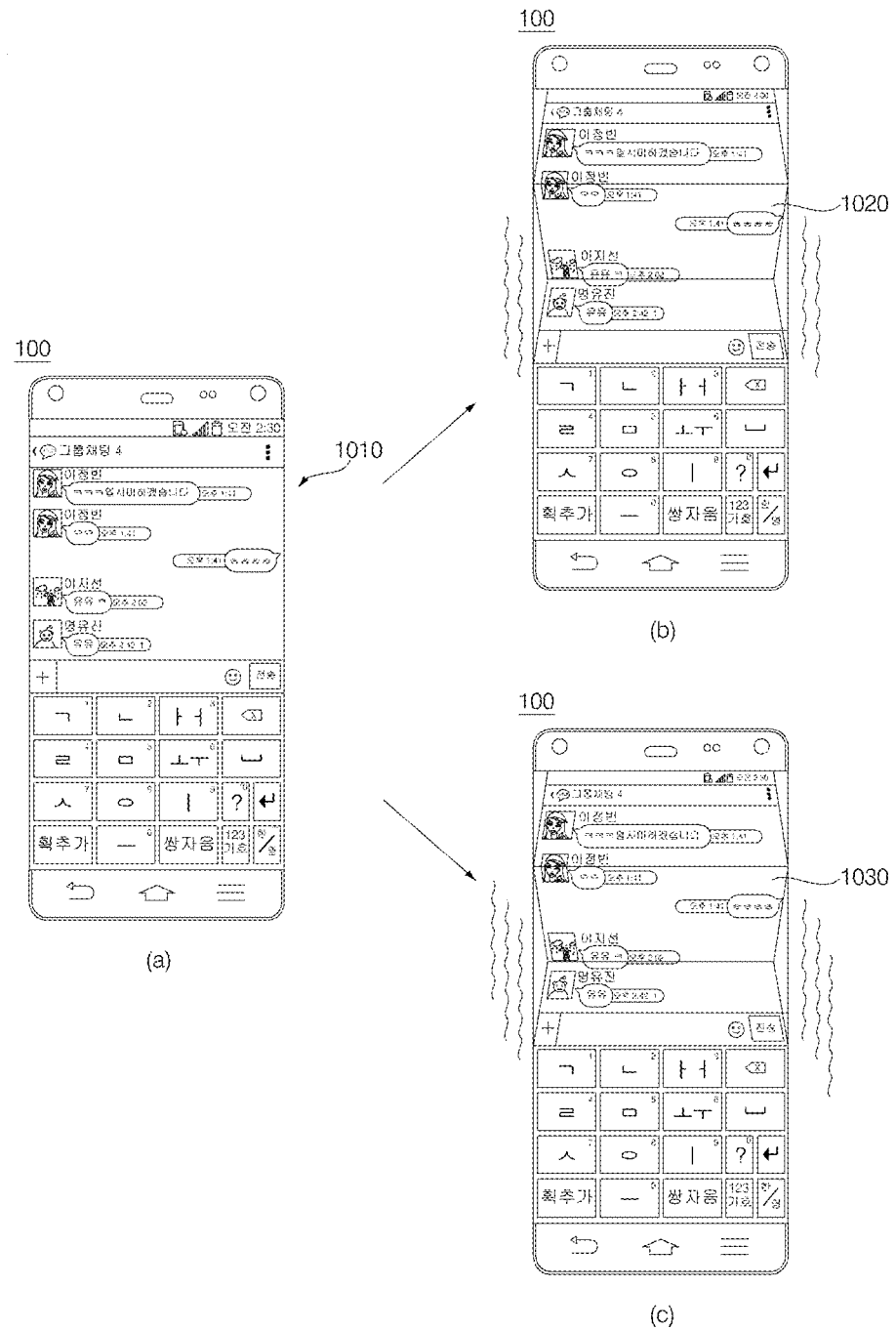
FIG. 10 is a view referred to for describing operation of a mobile terminal for outputting height of an obstacle with different vibrations.

FIG. 10 is a view referred to for describing operation of a mobile terminal for outputting height of an obstacle with different vibrations.

Referring to FIG. 10, the mobile terminal 100 displays a message screen 1010 on the display unit 151 according to a user command.

If an obstacle (that is, stairs) is detected through the rear laser sensor 125 when moving while viewing the messenger screen 1010, the mobile terminal 100 detects change in height of the ground based on the result of measuring the distance from the obstacle.

If a bent portion having a height lower than that of the ground is recognized as the detected result, the mobile terminal 100 may display a screen effect 1020 shown in (b) of FIG. 10 on the display unit 151. Here, the screen effect 1020 may refer to a screen effect of bending and displaying the messenger screen in the form of stairs.

In addition, if the bent portion having the height lower than that of the ground is detected, the mobile terminal 100 may output haptic effect having a first vibration pattern through the haptic module 153. In addition, when the bent portion is no longer detected, the mobile terminal 100 may again output the haptic effect having the same vibration pattern. Therefore, the user of the mobile terminal 100 may intuitively recognize that descending stairs are present through the first vibration pattern.

If a bent portion having a height higher than that of the ground is recognized as the detected result, the mobile terminal 100 may display a screen effect 1030 shown in (c) of FIG. 10 on the display unit 151. Here, the screen effect 1030 may refer to a screen effect of bending and displaying the messenger screen in the form of stairs.

In addition, if the bent portion having the height higher than that of the ground is detected, the mobile terminal 100 may output haptic effect having a second vibration pattern different from the first vibration pattern through the haptic module 153. In addition, when the bent portion is no longer detected, the mobile terminal 100 may again output the haptic effect having the same vibration pattern. Therefore, the user of the mobile terminal 100 may intuitively recognize that ascending stairs are present through the second vibration pattern.

Figure 11:
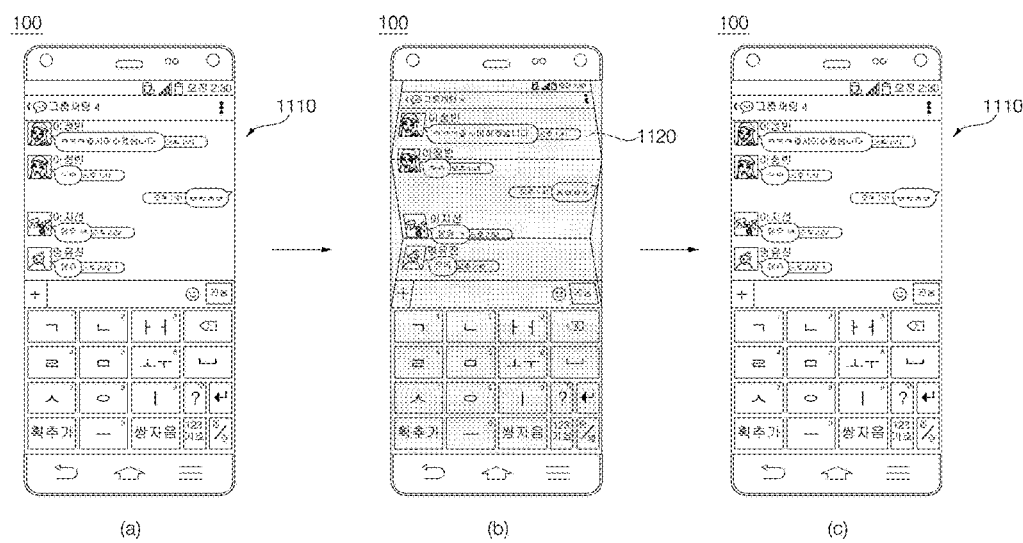
FIG. 11 is a view referred to for describing operation of a mobile terminal for controlling screen brightness according to detection of an obstacle.

FIG. 11 is a view referred to for describing operation of a mobile terminal for controlling screen brightness according to detection of an obstacle.

Referring to FIG. 11, the mobile terminal 100 displays a message screen 1110 on the display unit 151 according to a user command.

If an obstacle (that is, stairs) is detected through the rear laser sensor 125 when moving while viewing the messenger screen 1110, the mobile terminal 100 detects change in height of the ground based on the result of measuring the distance from the obstacle.

If a bent portion having a height lower or higher than that of the ground is recognized as the detected result, the mobile terminal 100 may display a screen effect 1120 shown in (b) of FIG. 11 on the display unit 151. Here, the screen effect 1120 may refer to a screen effect of bending and displaying the messenger screen in the form of stairs. Therefore, the user of the mobile terminal 100 may intuitively recognize that stairs are present through the screen effect 1120.

In addition, the mobile terminal 100 may perform control to decrease screen brightness to forbid the user from utilizing the terminal. Meanwhile, if the obstacle is no longer detected, the mobile terminal 100 removes the screen effect 1120 and returns the screen brightness to an original state, as shown in (c) of FIG. 11.

Figure 12:
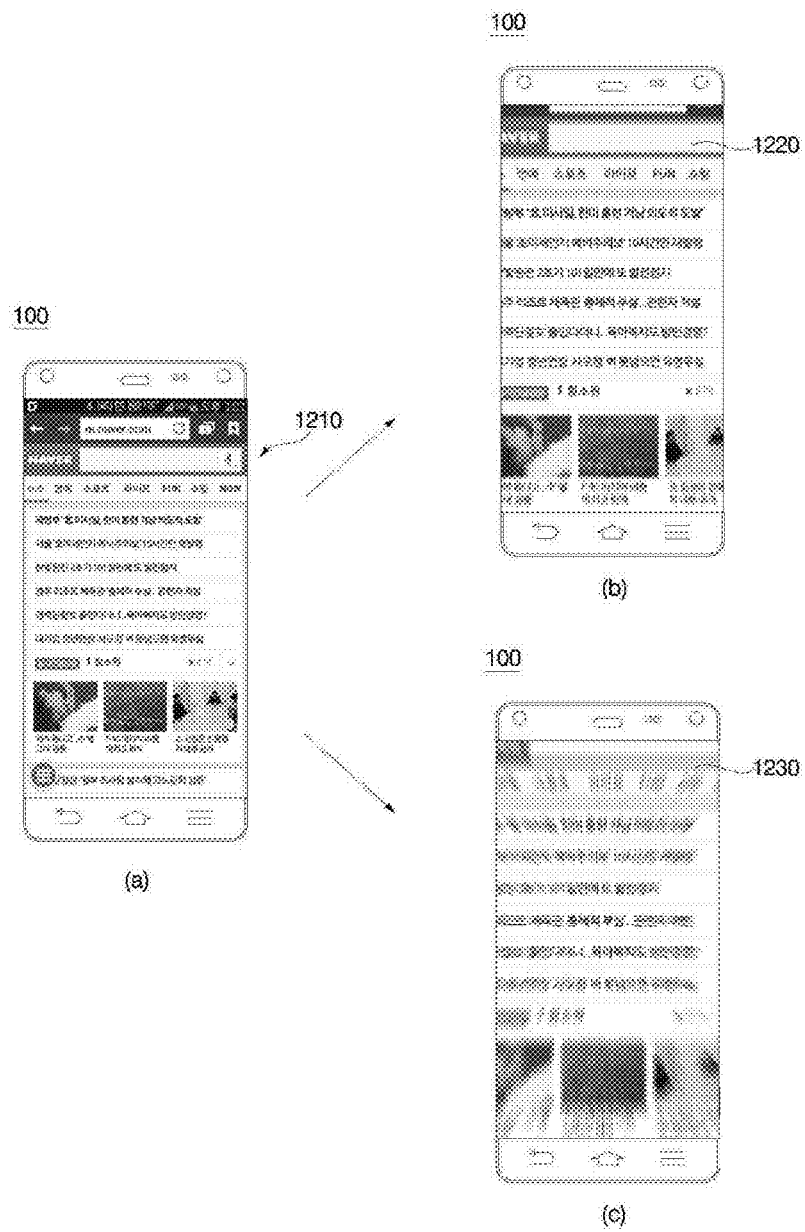
FIGS. 12 and 13 are views referred to for describing operation of a mobile terminal for providing different screen effects according to change in approach speed of an obstacle.
Figure 13:
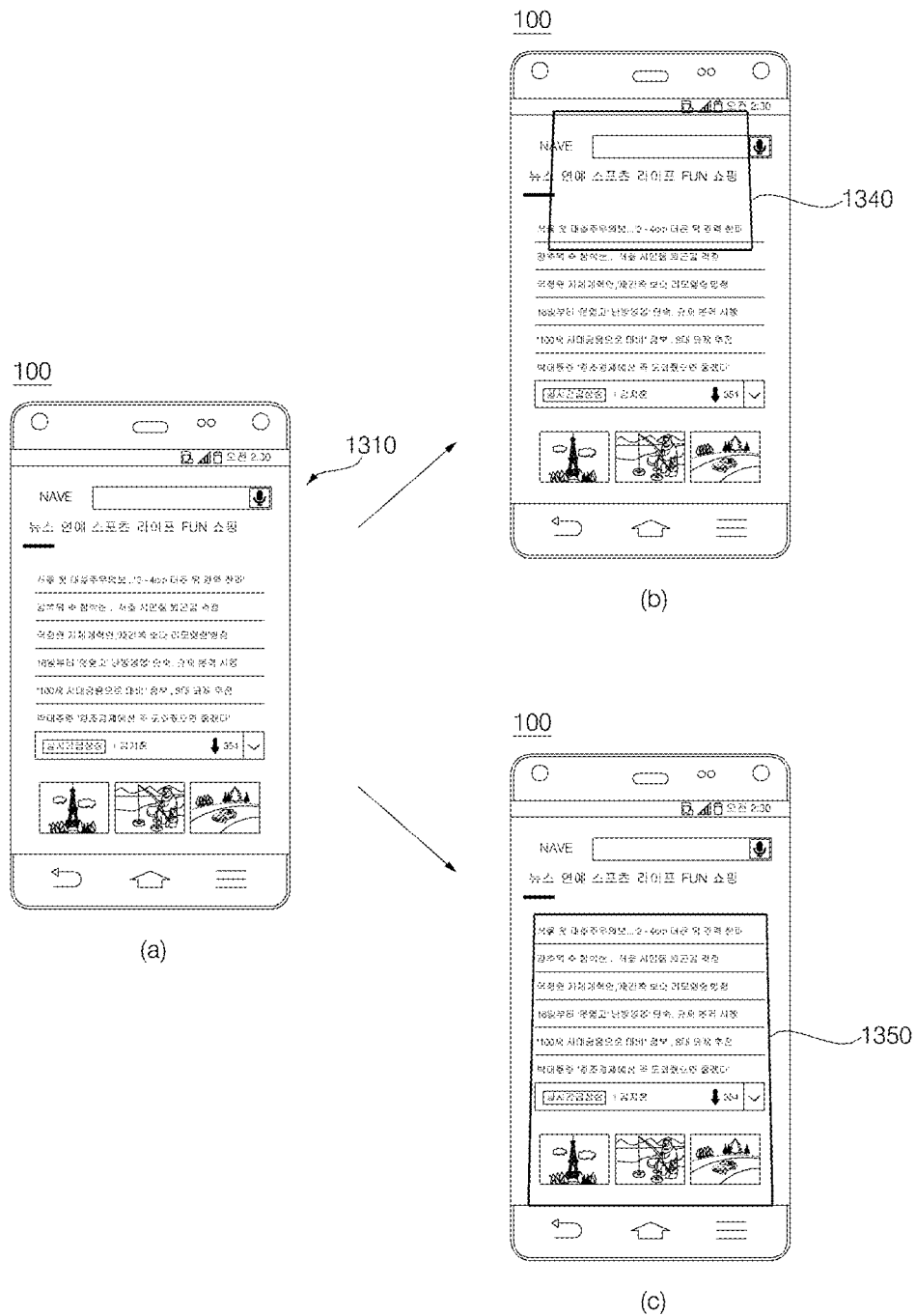

FIGS. 12 and 13 are views referred to for describing operation of a mobile terminal for providing different screen effects according to change in approach speed of an obstacle.

Referring to FIGS. 12 and 13, the mobile terminal 100 displays a webpage screen 1210 on the display unit 151 according to a user command.

If a front obstacle (that is, stairs) is detected through the rear laser sensor 125 when moving while viewing the webpage screen 1210, the mobile terminal 100 detects change in approach speed of the obstacle based on the result of measuring the distance from the obstacle.

If it is recognized that the obstacle approaches the mobile terminal or the mobile terminal approaches the obstacle at a low speed as the detected result, the mobile terminal 100 may display a screen effect 1220 shown in (b) of FIG. 12 on the display unit 151. Here, the screen effect 1220 may refer to a screen effect indicating the approach speed of the obstacle.

As another embodiment, if it is recognized that the obstacle approaches the mobile terminal or the mobile terminal approaches the obstacle at a low speed, the mobile terminal 100 may display a screen effect 1240 shown in (b) of FIG. 13 on the display unit 151. Here, the screen effect 1240 may refer to a screen effect of displaying an object corresponding to the obstacle on the screen and indicating the approach speed of the object.

Therefore, the user of the mobile terminal 100 may intuitively recognize that the obstacle approaches the mobile terminal or the mobile terminal approaches the obstacle at a low speed through the screen effect 1220 or 1240.

If it is recognized that the obstacle approaches the mobile terminal or the mobile terminal approaches the obstacle at a high speed as the detected result, the mobile terminal 100 may display a screen effect 1230 shown in (c) of FIG. 12 on the display unit 151. Here, the screen effect 1230 may refer to a screen effect indicating the approach speed of the obstacle.

As another embodiment, if it is recognized that the obstacle approaches the mobile terminal or the mobile terminal approaches the obstacle at a high speed, the mobile terminal 100 may display a screen effect 1250 shown in (c) of FIG. 13 on the display unit 151. Here, the screen effect 1250 may refer to a screen effect of displaying an object corresponding to the obstacle on the screen and indicating the approach speed of the object.

Therefore, the user of the mobile terminal 100 may intuitively recognize that the obstacle approaches the mobile terminal or the mobile terminal approaches the obstacle at a high speed through the screen effect 1230 or 1250.

Figure 14:
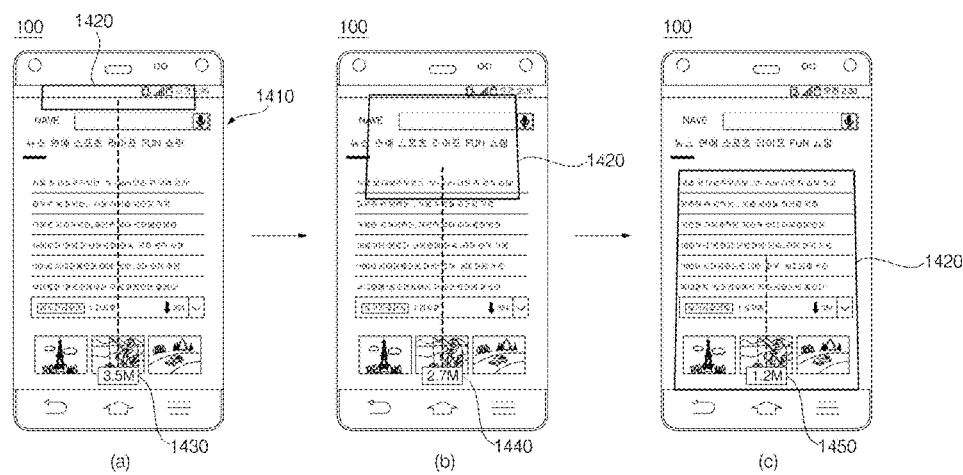
FIGS. 14 and 15 are views referred to for describing operation of a mobile terminal for displaying the location of and distance from a sensed obstacle in real time.
Figure 15:
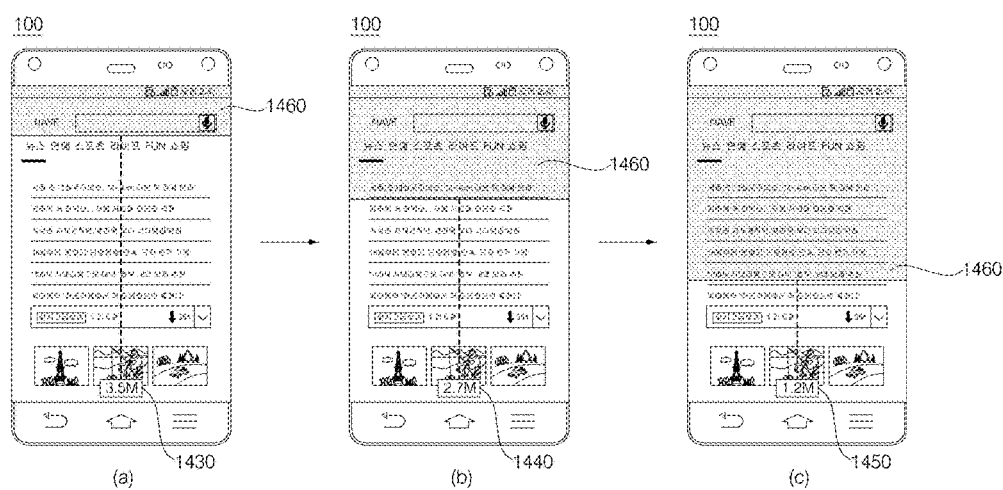

FIGS. 14 and 15 are views referred to for describing operation of a mobile terminal for displaying the location of and distance from a sensed obstacle in real time.

Referring to FIG. 14, the mobile terminal 100 displays a webpage screen 1410 on the display unit 151 according to a user command.

If a front obstacle (that is, stairs) is detected through the rear laser sensor 125 when moving while viewing the webpage screen 1410, the mobile terminal 100 measures the distance from the obstacle.

If the obstacle is a long distance away, the mobile terminal 100 may semitransparently display a portion of an object 1420 corresponding to the sensed obstacle at the upper end of the screen. In addition, the mobile terminal 100 may display distance information 1430 of the obstacle on the display unit 151.

As the distance from the obstacle gradually decreases, the mobile terminal 100 may display the object 1420 corresponding to the sensed obstacle while gradually moving the object to the lower end of the screen, as shown in (b) and (c) of FIG. 14. In addition, the mobile terminal 100 may display distance information 1440 and 1450 of the obstacle on the display unit 151. Therefore, the user of the mobile terminal 100 may intuitively recognize change in distance from the obstacle through the movement and distance information of the object 1420 displayed on the screen.

Referring to FIG. 15, if the obstacle is a long distance away, the mobile terminal 100 may semitransparently display a portion of an object 1460 corresponding to the sensed obstacle at the upper end of the screen. In addition, the mobile terminal 100 may display distance information 1430 of the obstacle on the display unit 151.

As the distance from the obstacle gradually decreases, the mobile terminal 100 may display the object 1460 while changing the size of the object according to change in distance from the sensed obstacle, as shown in (b) and (c) of FIG. 15. In addition, the mobile terminal 100 may display distance information 1440 and 1450 of the obstacle on the display unit 151. Therefore, the user of the mobile terminal 100 may intuitively recognize the speed of the mobile terminal approaching the obstacle or the obstacle approaching the mobile terminal through size change and distance information of the object 1460 displayed on the screen.

The present invention may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller 180 of the terminal. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A mobile terminal comprising:
 a display unit;
 a haptic module;
 an audio output module;
 a laser sensor configured to emit laser beams to sense an obstacle located on a movement path; and
 a controller configured to:
  activate the laser sensor upon detecting a predetermined event;
  measure a distance from the obstacle sensed through the activated laser sensor;
  cause the display unit to display obstacle notification information when the measured distance is within a threshold distance; and
  cause the haptic module to output a vibration effect or cause the audio output module to output a warning sound when the obstacle notification information is displayed.

2. The mobile terminal according to claim 1, wherein the laser sensor is a laser autofocus sensor.

3. The mobile terminal according to claim 1, wherein the laser sensor is provided at a rear surface of a body of the terminal.

4. The mobile terminal according to claim 1, wherein the predetermined event is an event in which movement of the terminal is sensed or an event in which a gaze of a user is detected by the display unit.

5. The mobile terminal according to claim 1, wherein, if predetermined gesture input is received, the controller performs control to make the obstacle notification information disappear from the display unit.

6. The mobile terminal according to claim 1, wherein, if the obstacle is no longer detected, the controller performs control to make the obstacle notification information disappear from the display unit.

7. The mobile terminal according to claim 1, wherein the controller provides a menu for setting an obstacle detection mode.

8. The mobile terminal according to claim 1, wherein the controller provides different screen effects according to an approach speed, type or shape of the sensed obstacle.

9. The mobile terminal according to claim 1, wherein the controller displays distance information of the sensed obstacle in a region of the display unit.

10. The mobile terminal according to claim 1, wherein the controller semitransparently displays an object corresponding to the sensed obstacle on the display unit.

11. The mobile terminal according to claim 1, wherein the controller changes a detection period of the laser sensor according to a movement speed of the terminal.

12. A method of controlling a mobile terminal, the method comprising:
   activating at least one laser sensor provided at a rear surface of a body of the terminal upon detecting a predetermined event;
   sensing an obstacle located on a movement path using the activated laser sensor;
   measuring a distance from the sensed obstacle;
   displaying obstacle notification information on a display unit when the measured distance is within a threshold distance; and
   outputting a vibration effect via a haptic module or warning sound via an audio output module when the obstacle notification information is displayed.

13. The method according to claim 12, wherein the predetermined event is an event in which movement of the terminal is sensed or an event in which a gaze of a user is detected by the display unit.

14. The method according to claim 12, further comprising removing the obstacle notification information displayed on the display unit if predetermined gesture input is received.

15. The method according to claim 12, further comprising removing the obstacle notification information displayed on the display unit if the obstacle is no longer detected.

16. The method according to claim 12, further comprising providing different screen effects according to an approach speed, type or shape of the sensed obstacle.

17. The method according to claim 12, further comprising displaying distance information of the sensed obstacle in a region of the display unit.

18. The method according to claim 12, further comprising changing a detection period of the laser sensor according to a movement speed of the terminal.

* * * * *